United States Patent [19]

Schreiner et al.

[11] Patent Number: 4,619,347
[45] Date of Patent: Oct. 28, 1986

[54] DISC BRAKE ASSEMBLY

[75] Inventors: Peter J. Schreiner; Daniel L. Bolenbaugh; David R. Krebs, all of South Bend, Ind.

[73] Assignee: Allied Corporation, Morristown, N.J.

[21] Appl. No.: 576,512

[22] Filed: Feb. 2, 1984

[51] Int. Cl.⁴ .......................................... F16D 55/224
[52] U.S. Cl. ................... 188/72.6; 188/71.9; 188/72.7; 188/106 F; 188/196 D
[58] Field of Search ............... 188/72.6, 72.7, 71.9, 188/106 F, 196 BA, 196 F, 196 D, 196 R; 403/144, 146, 149, 211, DIG. 7

[56] References Cited

U.S. PATENT DOCUMENTS

| | | | |
|---|---|---|---|
| 3,356,193 | 12/1967 | Stowers | 188/71.9 X |
| 3,610,373 | 10/1971 | Burnett | 188/71.9 |
| 3,661,230 | 5/1972 | Burnett | 188/72.6 X |
| 3,851,737 | 12/1974 | Hewins | 188/72.6 X |
| 3,862,807 | 1/1975 | Doden et al. | 403/144 X |
| 3,976,168 | 8/1976 | Yamamoto | 188/196 F X |
| 4,014,414 | 3/1977 | Yamamoto et al. | 188/170 |
| 4,503,948 | 3/1985 | Heidmann et al. | 188/72.8 |

FOREIGN PATENT DOCUMENTS

| | | |
|---|---|---|
| 1605978 | 12/1978 | Fed. Rep. of Germany . |
| 2646631 | 5/1981 | Fed. Rep. of Germany . |
| 47027 | 4/1980 | Japan .................................. 188/72.7 |
| 1283254 | 7/1972 | United Kingdom . |

Primary Examiner—George E. A. Halvosa
Attorney, Agent, or Firm—Ken C. Decker

[57] ABSTRACT

A disc brake assembly includes a caliper cooperating with a pair of friction pads to oppose rotation of a rotor. The caliper defines a bore receiving a piston assembly and a cartridge assembly. The cartridge assembly carries an actuator which is movable during a parking brake application.

10 Claims, 1 Drawing Figure

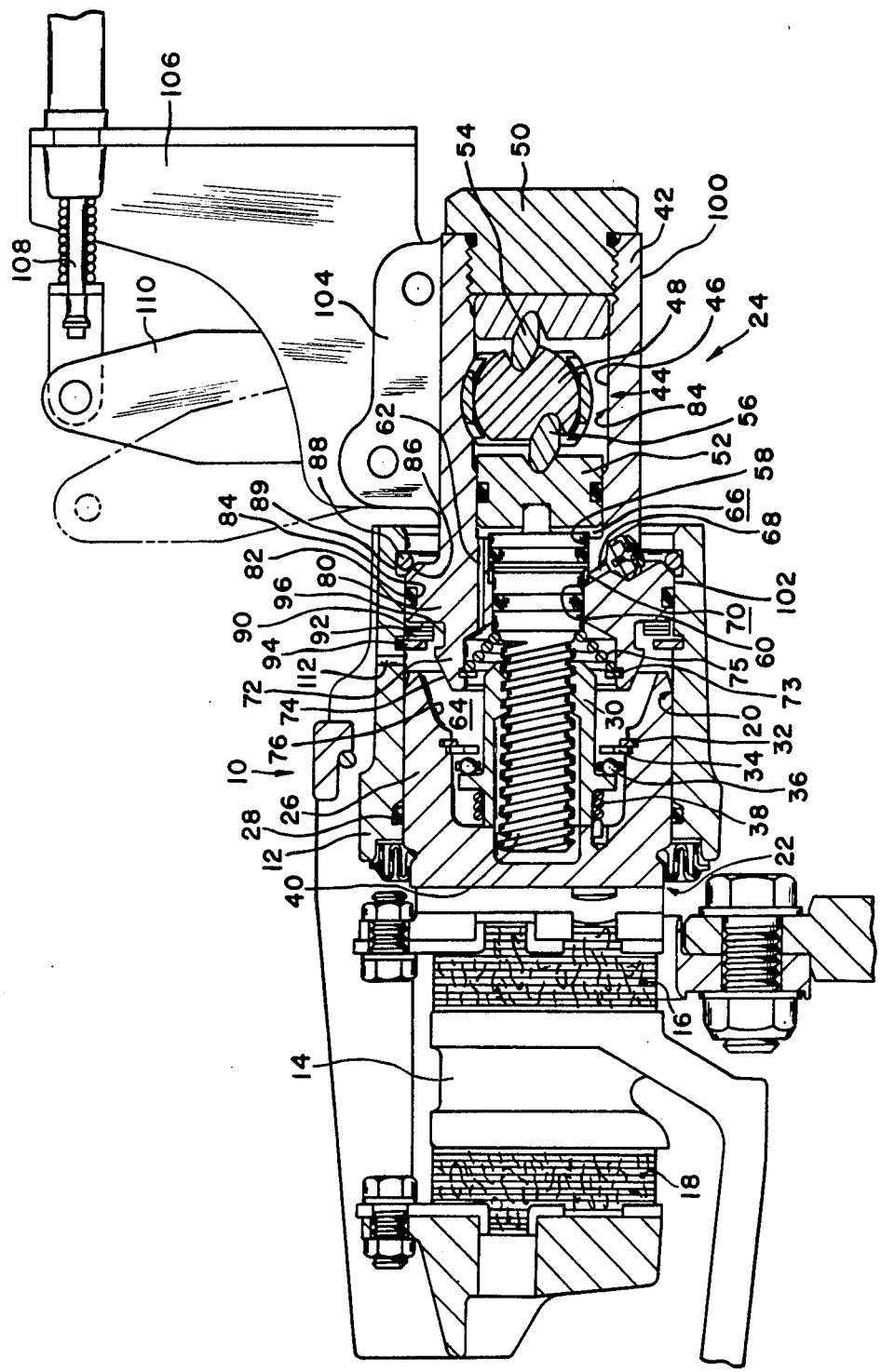

DISC BRAKE ASSEMBLY

This invention relates to a disc brake assembly which includes a piston assembly and a cartridge assembly. The piston assembly is pressure responsive to move during a service brake application and the cartridge assembly carries an actuator to impact movement to the piston assembly during a parking brake application.

A disc brake assembly includes a caliper cooperating with a pair of friction pads to urge the latter into engagement with a rotor to be braked. The caliper defines a bore extending therethrough to receive the piston assembly and the cartridge assembly. When the cartridge assembly includes a cam and lever arrangement to provide extension during the parking brake application, the size of the cartridge assembly is increased within the caliper bore so that the piston assembly is modified substantially to accommodate spacing for the cartridge assembly. In addition, the cartridge assembly is usually bolted to the caliper so that the cartridge assembly and caliper must be provided with aligned openings. The caliper requires a threaded tap while the cartridge assembly diameter must be larger than the caliper bore to accommodate a bolt in alignment with the caliper threaded opening.

The prior art is further illustrated in U.S. Pat. Nos. 4,374,551 (Birkenbach, et al.); 4,267,903 (Kita, et al.); 4,278,152 (Tosi); and 4,004,658 (Margetts, et al.).

The present invention provides a disc brake assembly with service and parking brake application characteristics comprising a caliper cooperating with a pair of friction pads to retard rotation of the rotor, the caliper defining a bore extending therethrough from one open end adjacent one of the friction pads to another end remote from the one friction pad, the caliper bore receiving a piston assembly movable in the caliper bore to bias the one friction pad into engagement with the rotor and a cartridge assembly cooperating with the piston assembly to define a pressure chamber receiving fluid pressure during the service brake application, and the cartridge assembly including an actuator to extend the cartridge assembly during the parking brake application, characterized in that said cartridge assembly includes a body sealingly engaging the wall of said caliper bore to isolate said pressure chamber, said body defining a sliding interface at the location of sealing engagement with the wall of said caliper bore permitting relative movement between said body and said caliper, and said cartridge assembly includes resilient means extending from said caliper to said body to bias the latter away from said piston assembly to a rest position engaging a stop on said caliper.

It is an advantage of the present invention that the caliper bore is the only part of the caliper that is machined to accommodate the cartridge assembly. The cartridge assembly is also provided with a stepped cylindrical outer surface defining a large diameter smaller than a diameter dimension for the caliper bore.

The sole FIGURE is a cross sectional view of a disc brake constructed in accordance with the present invention.

The disc brake assembly 10 includes a caliper 12 supported for movement relative to a rotor 14 to be braked. The caliper cooperates with an inner friction pad 16 and an outer friction pad 18 to bias the pads into engagement with the rotor 14 during a service brake application. The caliper 12 defines a bore 20 extending therethrough on the inner side of the rotor 14. The bore 20 receives a piston assembly 22 and a cartridge assembly 24.

The piston assembly 22 includes a piston 26 slidably disposed in bore 20 in sealing engagement with seal 28. A nut 30 is carried with the piston 26 via a snap ring 32, washer 34 and thrust bearing 36. A one way clutch coil spring 38 permits the nut to rotate in one direction about an axis for the bore 20. The nut cooperates with a threaded stem 40 of the cartridge assembly 24 in a conventional manner to adjust the position of the piston assembly relative to the cartridge assembly 24 in response to wear of the pads 16 and 18.

The cartridge assembly 24 includes a body 42 with an opening 44 therethrough. The opening is stepped with a first diameter portion 46 receiving an actuator or cam 48, a plug 50 and output member 52. The actuator 48 cooperates with toggles 54 and 56 to impart movement to the output member 52 in response to rotation of the cam about an axis normal to the axis of opening 44. A second diameter portion 58 and a third diameter portion 60 sealingly engage the threaded stem 40 to define a differential area. The body includes a first passage 62 communicating a pressure chamber 64 with a chamber 66 between stem 40 and output member 52. A second passage 68 vents the cavity 70 defined between the sections 58, 60 and the threaded stem 40. A leading edge 72 of the body 42 forms a frusto conical outer surface 74 to partially telescope into piston recess 76. The leading edge 72 also carries a snap ring 73 within opening 44 to oppose a spring 75 biasing stem 40 to its rest position.

The body 42 is substantially uniform in thickness except for an enlarged thickness section 80 forming diameter portions 58 and 60, and passages 62 and 68. The enlarged thickness section 80 also carries a seal 82 in a recess 84 so that the enlarged thickness section 80 sealingly engages the wall of caliper bore 20. The enlarged thickness section 80 defines a first shoulder 86 opposing a stop 88 to prevent removal of the body from the caliper bore. A second shoulder 90 on the enlarged thickness section 80 opposes a resilient member 92 extending between the shoulder 90 and a snap ring 94 fixedly carried in the caliper bore 20. The inner diameter of resilient member 92 is less than the outer diameter of leading edge 72 so that the resilient member 92 is carried on the body 42 in a recess 96 between the leading edge 72 and the shoulder 90.

The body 42 defines a first outer diameter section 100 from the shoulder 86 to the plug 50 that is substantially uniform with a cylindrical outer surface. This first outer diameter section 100 is substantially equal in diameter to the diameter defined by the leading edge and smaller in diameter than a second outer diameter section 102 between shoulders 86 and 90. Both outer diameter sections 100 and 102 are smaller in diameter than the diameter of caliper bore 20. An integrally extending flange 104 is provided at the diameter section 100. The flange supports a bracket 106 carrying a cable 108 assembly coupled to a lever 110 which imparts rotation to the cam 48. In the alternative, the flange 104 could be separate from the body 42.

The caliper is provided with an inlet port 112 so that during a service brake application fluid pressure is communicated to the chamber 64. The piston 26 is moved toward the rotor 14 to directly engage pad 16 therewith and the caliper 12 is moved to the right in the FIGURE to engage the pad 18 with the rotor 14. When the piston 26 moves, the washer 34 is also moved toward the thrust bearing. If the washer 34 engages the thrust bearing, the bearing biases the nut 30 to rotate on the threaded stem 40 and advance in the direction of the rotor. The spring 38 permits nut rotation for advancement only toward the rotor. At a predetermined pressure level in chamber 64 and chamber 66, the threaded stem 40 moves toward the rotor to carry the nut 30 slightly away from washer 34 and prevent further adjustment. As a result, the piston 26 is maintained in an adjusted position to take up clearances resulting from wear of the pads 16 and 18.

During a parking brake application, the lever 110 is rotated clockwise in the FIGURE to also rotate the cam 48. The cam cooperates with the toggles 54 and 56 to move output member 52, threaded stem 40, nut 30 and piston 26 toward the rotor 14, thereby directly engaging pad 16 with rotor 14 and moving caliper 12 to, in turn, engage pad 18 with rotor 14.

During assembly, the piston assembly 22 comprising piston 26, spring 38, bearing 36, washer 34, snap ring 32 and nut 30 is inserted into the bore 20 from the end of bore 20 facing pad 16. The snap ring 94 is disposed in the bore from a remote end to limit insertion of the piston assembly 22. Next, the cartridge assembly 24 is inserted in the bore 20 from the end remote from pad 16. The cartridge assembly 24 is rotated to advance the threaded stem 40 on the nut 30. As the body moves into the bore 20, the shoulder 90 cooperates with the snap ring 94 to contract spring 92. The body is rotated until the caliper bore groove 89 receiving stop 88 is fully exposed for receiving the stop 88. Thereafter, the spring 92 bias the body to fully engage the stop 88 and opposes axial vibration of the body within the bore 20.

We claim:

1. Disc brake assembly comprising a rotor, a pair of friction pads supported adjacent said rotor, a caliper for urging said friction pads into braking engagement with said rotor when a brake application is effected, said caliper defining a bore therewithin, a piston slidably mounted in said bore to bias one of said friction pads against said rotor, said piston being mounted in an end of the bore adjacent said one friction pad, the other end of said caliper defining an opening, and a cartridge assembly including a body housing received in said opening, and means securing said body housing in said opening, said body housing cooperating with the said bore and said piston to define a fluid pressure chamber therebetween for receiving fluid pressure during a service brake application, said body housing defining a bore therewithin, and parking brake actuating means mounted in said bore of said body housing, said parking brake actuating means including a force transmitting stem slidably supported in the bore of the body housing and projecting therefrom into the bore of said caliper housing for force transmitting engagement with said piston when a parking brake application is effected, and manually actuated means in said bore of the body housing for urging said force transmitting stem toward said piston, said securing means including a sliding interface between the bore of the caliper and said body housing, sealing means at said sliding interface, a stop on said caliper, said sliding interface permitting relative movement of said body housing with respect to said caliper toward and away from said stop, and resilient means between said caliper and said body housing to bias the latter away from said piston assembly and into engagement with said stop.

2. The disc brake assembly of claim 1 in which said body housing defines a leading edge forming an interference fit with said resilient means to carry the latter on said body housing when said body housing is spaced from said caliper.

3. The disc brake assembly of claim 1 in which said caliper carries an abutment within said caliper bore limiting movement of said piston assembly toward said cartridge assembly.

4. The dics brake assembly of claim 1 in which said body housing includes a large diameter section defining the sliding interface at the wall of said caliper bore.

5. The disc brake assembly of claim 4 in which said body housing includes a first small diameter section extending toward said piston assembly and carrying said resilient means, and a second small diameter section extending outwardly of said caliper bore to carry said actuator.

6. The disc brake assembly of claim 1 in which said body housing defines a leading edge telescoping into said piston assembly, said cartridge assembly includes a stem cooperating with said piston assembly, and said leading edge opposes a resilient member engageable with said stem to bias the latter toward said actuator.

7. The disc brake assembly of claim 1 in which said body housing defines a small diameter section extending outwardly from said caliper bore, and said small diameter section includes a transversely extending flange cooperating with said actuator to support the latter relative to said body housing.

8. The disc brake assembly of claim 1 in which said body housing defines a large diameter section defining the sliding interface at the wall of said caliper bore and a small diameter section extending outwardly of said caliper bore, said small diameter section defining a length larger than the remaining length for said body housing.

9. The invention of claim 1, wherein a resilient member yieldably urges said force transmitting stem away from said piston and to a rest position in said housing.

10. The invention of claim 1, wherein the bore of said caliper is provided with a recess receiving a snap ring for engagement by the piston to limit movement of the piston, said resilient means being disposed between said snap ring and said body housing to urge the latter toward said stop.

* * * * *